United States Patent
Minamino et al.

(10) Patent No.: US 6,974,845 B1
(45) Date of Patent: Dec. 13, 2005

(54) POLYMER COMPOSITION CROSSLINKABLE WITH ULTRAVIOLET

(75) Inventors: Etsuo Minamino, Osaka (JP); Kazuyoshi Mimura, Matsusaka (JP); Mitsuhiro Otani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 36 days.

(21) Appl. No.: 10/069,791

(22) PCT Filed: Aug. 28, 2000

(86) PCT No.: PCT/JP00/05780

§ 371 (c)(1),
(2), (4) Date: Feb. 28, 2002

(87) PCT Pub. No.: WO01/16234

PCT Pub. Date: Mar. 8, 2001

(30) Foreign Application Priority Data

Aug. 31, 1999 (JP) .................................. 11-244653

(51) Int. Cl.$^7$ .................................................. C08J 3/28
(52) U.S. Cl. ................. 522/117; 522/121; 525/279; 525/281; 525/305; 525/313
(58) Field of Search .............................. 522/117, 121; 525/313, 305, 279, 281

(56) References Cited

U.S. PATENT DOCUMENTS

| | | | |
|---|---|---|---|
| 4,209,582 A | 6/1980 | Merrill et al. | |
| 4,254,194 A | 3/1981 | Merrill et al. | |
| 4,286,048 A | 8/1981 | Merrill et al. | |
| 5,169,902 A | * 12/1992 | Yagi et al. | .................. 525/301 |
| 5,656,697 A | 8/1997 | Wlassics et al. | |
| 6,346,300 B1 | * 2/2002 | Ruepping | .................. 427/517 |

FOREIGN PATENT DOCUMENTS

| | | | |
|---|---|---|---|
| EP | 0 400 746 A2 | 12/1990 | |
| EP | 0 759 447 A2 | 2/1997 | |
| EP | 0 885 928 A1 | 12/1998 | |
| JP | 53125491 A | * 11/1978 | ........... C08F 14/18 |
| JP | 59020310 A | * 2/1984 | ........... C08F 14/18 |
| JP | 61031411 | 2/1986 | |
| JP | 8-157538 | 6/1996 | |
| JP | 9-255732 | 9/1997 | |
| WO | WO 95/15995 A1 | 6/1995 | |
| WO | WO 01/05885 A1 | 1/2001 | |

OTHER PUBLICATIONS

International Search Report for PCT/JP00/05780 dated Nov. 21, 2000.
International Preliminary Examination for PCT/JP00/05780 dated May 14, 2001.
Supplementary European Search Report for EP 00 95 5053 dated Nov. 5, 2002.
Communication Pursuant To Article 115(c) EPC, European Patent Application No. 00955053.4 dated Dec. 6, 2002.

* cited by examiner

*Primary Examiner*—Bernard Lipman
(74) *Attorney, Agent, or Firm*—Sughrue Mion, PLLC

(57) ABSTRACT

An ultraviolet-crosslinkable polymer composition comprising a polymer containing iodine and/or bromine in an amount of from 0.001 to 10% by weight, a photoinitiator as a crosslinking agent and a polyfunctional unsaturated compound as a crosslinking aid. By using iodine and/or bromine as a crosslinking point, it is possible to carry out crosslinking of various polymers including fluorine-containing polymers which have been very difficult to crosslink with ultraviolet rays, and molding or processing can be made easily at working site at low temperature.

10 Claims, No Drawings

POLYMER COMPOSITION CROSSLINKABLE WITH ULTRAVIOLET

TECHNICAL FIELD

The present invention relates to a polymer composition having iodine and/or bromine which is crosslinkable by irradiation with ultraviolet rays.

BACKGROUND ART

For crosslinking a fluorine-containing polymer, particularly a fluorine-containing elastomer, usual crosslinking methods are polyamine vulcanization, polyol vulcanization and organic peroxide vulcanization. In any of those methods, high temperature is necessary in order to obtain a crosslinked article and therefore application thereof is limited.

Particularly in case of a method of crosslinking a fluorine-containing elastomer having iodine or bromine, generally a method of crosslinking with an organic peroxide is employed. However the crosslinking needs to be carried out at high temperature and in case of usual molding, a crosslinking reaction does not proceed in the neighborhood of an interface with oxygen and staining of a metal die arises. Thus there is a problem with processability.

JP-B-5-63482, etc. describe crosslinking methods other than the method of crosslinking by using heat energy, namely methods of crosslinking by using radiation, etc. Such methods require expensive facilities and are not carried out easily and therefore application thereof is limited to only particular fields.

For example, in crosslinking of a fluorine-containing polymer, ionizing radiation, etc. have been adopted practically for crosslinking of a tetrafluoroethylene-ethylene copolymer (ETFE), polyvinylidene fluoride (PVdF), and the like, but only in the field of electric cables. As for perfluoropolymers, it is assumed that crosslinking thereof is still difficult.

On the other hand, urethane rubber and silicone rubber are on the market and are widely used because crosslinking need not be carried out at high temperature and can be carried out at room temperature. However the urethane rubber has a problem with heat resistance and water resistance, and the silicone rubber has a problem with chemical resistance and oil resistance.

As mentioned above, there have been no fluorine-containing polymer compositions which could be cured at room temperature while maintaining excellent properties of the fluorine-containing polymer.

An object of the present invention is to provide a crosslinkable composition comprising a polymer containing iodine and/or bromine in a specific amount, particularly an ultraviolet-crosslinkable fluorine-containing polymer, and also to provide a crosslinked article obtained from the composition.

DISCLOSURE OF INVENTION

The present invention relates to an ultraviolet-crosslinkable polymer composition which comprises a polymer containing 0.001 to 10% by weight of iodine and/or bromine, a photoinitiator as a crosslinking agent and a polyfunctional unsaturated compound as a crosslinking aid.

When the polymer is a fluorine-containing polymer, particularly a fluorine-containing elastomer, an excellent effect is exhibited.

Hitherto in crosslinking with ultraviolet rays, usually an acryl group is activated by irradiation of ultraviolet rays to become a crosslinking point. However in the present invention, iodine or bromine contained in the polymer is a crosslinking point. Such a crosslinking system has not been known and is a novel one.

BEST MODE FOR CARRYING OUT THE INVENTION

In the present invention the polymer having iodine and/or bromine may be a resin or an elastomer.

For introducing iodine or bromine into the polymer, various known methods can be used. For example, there are (1) a method of copolymerizing a monomer having iodine and/or bromine (hereinafter referred to as "Introducing Method 1". JP-A-8-53595, JP-B-5-63482, JP-A-4-288305, JP-B-53-4115, etc.); (2) a method of using an iodine or bromine compound as a polymerization initiator or a chain transfer agent (hereinafter referred to as "Introducing Method 2". JP-A-63-23907, JP-B-6-11773, JP-B-1-16844, JP-B-63-41928, JP-B-5-406, JP-A-62-36407, etc.), and the like. The introducing method is not limited to them.

First, a resin as a basic component is explained below. Either of a non-fluorine-containing resin and a fluorine-containing resin may be used as a resin.

Examples of the non-fluorine-containing resin are, for instance, homopolymers or copolymers of poly(meth) acrylic acid esters such as polymethyl methacrylate and polyethyl acrylate. Examples of the monomer to be used are methyl acrylate, ethyl acrylate, methyl methacrylate, ethyl methacrylate, and the like. Examples of the comonomer are, for instance, ethylene, propylene, vinyl chloride, vinylidene chloride, acrylonitrile, vinyl esters such as vinyl acetate, vinyl ethers such as ethyl vinyl ether, vinyl monomers such as styrene, and the like.

Examples of the fluorine-containing resin are homopolymers or copolymers of fluorine-containing (meth)acrylic acid esters represented by the formula (1):

$$CH_2=CX-COOCH_2(CF_2)_nY \qquad (1)$$

wherein X is H, F or $CH_3$, n is an integer of from 1 to 8, Y is H or F. Examples of the comonomer are the above-mentioned (meth)acrylic acid esters and/or vinyl monomers.

Also there are polytetrafluoroethylene, polyvinylidene fluoride, ethylene-tetrafluoroethylene copolymer, ethylene-chlorotrifluoroethylene copolymer, tetrafluoroethylene-hexafluoropropylene copolymer, tetrafluoroethylene-perfluoro(alky vinyl ether) copolymer, and the like.

While the elastomer to be used in the present invention may be a non-fluorine-containing elastomer, particularly a fluorine-containing elastomer which has been unable to be crosslinked with ultraviolet rays can be used preferably. Examples of the fluorine-containing elastomer are, for instance, vinylidene fluoride copolymers such as vinylidene fluoride-hexafluoropropylene copolymer, vinylidene fluoride-tetrafluoroethylene-hexafluoropropylene copolymer and vinylidene fluoride-chlorotrifluoroethylene copolymer; tetrafluoroethylene-propylene copolymer and ethylene-hexafluoropropylene copolymer; fluoro(alkyl vinyl ether) (encompassing those having plural ether bonds)-olefin copolymers such as vinylidene fluoride-tetrafluoroethylene-perfluoro(alkyl vinyl ether) copolymer and tetrafluoroethylene-perfluoro(alkyl vinyl ether) copolymer; alkyl vinyl ether-chlorotrifluoroethylene copolymer, and the like.

Also other monomer component copolymerizable thereto may be copolymerized. Examples thereof are vinyl chloride, vinylidene chloride, acrylonitrile, vinyl esters such as vinyl acetate, vinyl ethers such as ethyl vinyl ether, styrene, and the like.

In the present invention the fluorine-containing elastomer may be the above-mentioned fluorine-containing elastomers and in addition, those having, as an elastomer chain, a perfluoro elastomer chain represented by the following formula (2) or (3) or a non-perfluoro elastomer chain represented by the formula (4), (5), (6) or (7). A copolymer elastomer chain represented by the formula (2):

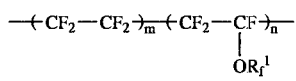

wherein m is from 95 to 50, n is from 5 to 50, $R_f^1$ is a perfluoroalkyl group having 1 to 8 carbon atoms, A terpolymer elastomer chain represented by the formula (3):

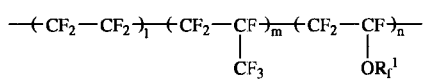

wherein l is from 95 to 35, m is from 0 to 30, n is from 5 to 35, $R_f^1$ is a perfluoroalkyl group having 1 to 8 carbon atoms, A copolymer elastomer chain represented by the formula (4):

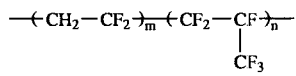

wherein m is from 85 to 60, n is from 15 to 40,

A terpolymer elastomer chain represented by the formula (5):

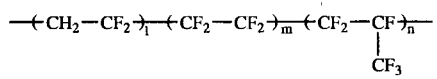

wherein l is from 85 to 20, m is from 0 to 40, n is from 15 to 40,

A terpolymer elastomer chain represented by the formula (6):

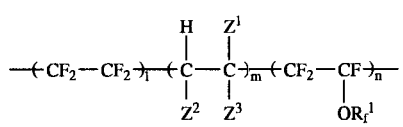

wherein l is from 95 to 45, m is from 0 to 10, n is from 5 to 45, $Z^1$, $Z^2$ and $Z^3$ are fluorine atom or hydrogen atom independently, $R_f^1$ is a perfluoroalkyl group having 1 to 8 carbon atoms, and A non-perfluoro elastomer chain represented by the formula (7):

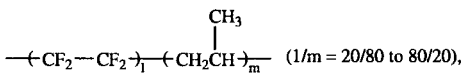

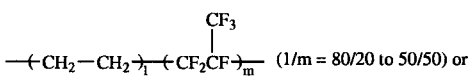

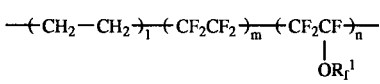

(l is from 1 to 80, m is from 0 to 80, n is from 10 to 50, $R_f^1$ is as defined above).

Further there may be used a fluorine-containing multi-segment polymer prepared by block-copolymerizing the above-mentioned elastomer as an elastomer segment with a fluorine-containing resin as a hard segment.

Then the monomer for introducing iodine and/or bromine is explained below.

Examples of the monomer having iodine and/or bromine which can be used in Introducing Method 1 are monomers described in the above-mentioned JP-A-8-53595. Examples thereof are, for instance, $CH_2=CHCH_2OCOCF_2CH_2I$, $CH_2=CHCOOCH_2CH_2(CF_2)_4I$, $CH_2=CHCOOCH_2CH_2I$, $CH_2=CHCH_2OCH_2CH_2(CF_2)_4I$, $CH_2=CHCH_2OCH_2CH_2I$, $CH_2=CHCH_2OCOCF_2CH_2Br$, $CH_2=CHCOOCH_2CH_2(CF_2)_4Br$, $CH_2=CHCOOCH_2CH_2Br$, $CH_2=CHCH_2OCH_2CH_2(CF_2)_4Br$, $CH_2=CHCH_2OCH_2CH_2Br$, and the like. It is preferable that those iodine- and/or bromine-containing monomers are used for the non-fluorine-containing polymers from the viewpoint of copolymerizability.

Also there are monomers described in the above-mentioned JP-B-5-63482, JP-A-4-288305, JP-B-53-4115, etc. Examples thereof are, for instance, $CF_2=CFOCF_2CF_2CH_2I$, $CF_2=CFOCF_2(CF_3)CFOCF_2CF_2CH_2I$, $CF_2=CFI$, $CF_2=CHBr$, $CH_2=CHCF_2CF_2Br$, $CF_2=CFOCF(CF_3)CF_2OCF_2Br$, and the like. It is preferable that those iodine- and/or bromine-containing monomers are used for the fluorine-containing polymers from the viewpoint of copolymerizability.

Polymerization methods which can be used for this introducing method are known methods such as emulsion polymerization, suspension polymerization, solution polymerization, and the like.

The monomer is copolymerized in such an amount that iodine and/or bromine are contained in the obtained polymer in an amount of from 0.001 to 10% by weight, preferably from 0.05 to 7% by weight.

Introducing Method 2 is a method of introducing iodine and/or bromine into an end of the polymer by using iodine and/or bromine or a compound having iodine and/or bromine as a polymerization initiator or a chain transfer agent.

Examples of such a polymerization initiator are, for instance, those described in the above-mentioned JP-A-63-23907. Concretely there are, for example, $(ICF_2COO)_2$, and the like.

Examples of such a chain transfer agent are, for instance, those described in the above-mentioned JP-B-6-11773, JP-B-1-16844, JP-B-63-41928, JP-B-5-406, JP-A-62-36407, etc. Concretely there are, for example, I(CF$_2$)$_4$I, CH$_2$I$_2$, (ICF$_2$CF$_2$)$_2$C$_6$F$_4$, CF$_2$Br$_2$, BrCH$_2$CH$_2$I, and the like. It is preferable that those iodine- and/or bromine-containing monomers are used for the fluorine-containing polymers from the viewpoint of chain transfer reaction.

Particularly from the viewpoint of easiness of crosslinking reaction, iodine-containing monomers are preferable.

Examples of a polymerization method which can be used for those introducing methods are known methods such as emulsion polymerization, suspension polymerization and solution polymerization.

The polymers must contain iodine or bromine (a total amount thereof when the both are contained) in an amount of from 0.001 to 10% by weight. When the amount is less than 0.001% by weight, crosslinking cannot be carried out sufficiently, and when the amount is more than 10% by weight, properties of the polymer such as heat resistance are lowered. The preferred content thereof is from 0.05 to 7% by weight.

From the viewpoint of high crosslinking reactivity, it is preferable that the polymers mainly contain iodine rather than bromine.

In the present invention, the iodine- and/or bromine-containing polymers may be used alone or in a mixture of two or more thereof. The polymers may be blended to other polymer which does not contain iodine (bromine). Examples of the other non-iodine (non-bromine)-containing polymer which may be blended are, for instance, ultraviolet-crosslinkable polymers, such as epoxy acrylate, urethane acrylate, polyester acrylate and polyether acrylate.

The ultraviolet-crosslinkable polymer composition of the present invention comprises the above-mentioned iodine- and/or bromine-containing polymer, a photoinitiator and a polyfunctional unsaturated compound.

The photoinitiator to be used in the present invention acts as a crosslinking agent, and photoinitiators which have been known in ultraviolet crosslinking can be used. Examples thereof are acetophenone initiators such as chloroacetophenone, diethoxyacetophenone, α-aminoacetophenone, and hydroxyacetophenones, i.e. 2-hydroxy-2-methyl-1-phenyl-propane-1-one, 1-(4-isopropylphenyl)-2-hydroxy-2-methyl-propane-1-one and 1-hydroxycyclohexylphenylketone; benzoine initiators such as benzoine, benzoine ether and dimethylbenzyl ketal; benzophenone initiators such as benzophenone, benzoylbenzoic acid, hydroxybenzophenone, 4-phenylbenzophenone and acrylated benzophenone; thioxanthone initiators such as thioxanthone, 2-methylthioxanthone and 2,4-dimethylthioxanthone; α-acyloxime ester, acylphosphine oxide, benzyl, camphorquinone, 2-ethylanthraquinone, Michler's ketone, and the like.

An amount of the photoinitiator is usually from about 0.05 to about 10 parts by weight (hereinafter referred to as "part"), preferably from 1 to 5 parts based on 100 parts of the above-mentioned iodine- and/or bromine-containing polymer.

In case of benzophenone or thioxanthone initiators, a hydrogen donor may be added as a photoinitiating aid. Examples of the hydrogen donor are, for instance, aliphatic amines such as triethanolamine, methyldiethanolamine and triisopropanolamine; aromatic amines such as 4,4'-diethylaminophenone, 4-dimethylaminoethyl benzoate and 4-dimethylamino(n-buthoxy)ethyl benzoate, and the like.

An amount of the hydrogen donor is usually from about 0.05 to about 10 parts, preferably from 0.5 to 5 parts based on 100 parts of the above-mentioned polymer.

The polyfunctional unsaturated compound to be used in the present invention acts as a crosslinking aid. The polyfunctional unsaturated compound is not limited and is effective as far as it has a reactivity against both of a polymer radical derived from iodine and/or bromine and generated by irradiation of ultraviolet rays and a radical derived from the photoinitiator.

Examples of the preferable polyfunctional unsaturated compound are, for instance, various diacrylates, trimethylolpropane triacrylate (TMPTA), trimethylolpropane trimethacrylate, triallyl isocyanurate (TAIC), triallyl cyanurate, triallyl trimellitate, pentaerythritol triacrylate, pentaerythritol tetraacrylate, dipentaerythritol hexaacrylate, N,N'-m-phenylenebismaleimide, dipropargyl terephthalate, diallyl phthalate, tetraallyl terephthalamide, triallyl phosphate, and the like. Among them, those having three or more functional groups are particularly preferable from the viewpoint of easiness of crosslinking of the polymer.

An amount of the polyfunctional unsaturated compound is from about 0.05 to about 10 parts, preferably from 0.5 to 5 parts based on 100 parts of the above-mentioned polymer.

Also as the case demands, a filler, processing aid, antioxidant, age resister, antiozonant, ultraviolet ray absorber, and the like may be blended.

Examples of the filler are metal oxides such as magnesium oxide, calcium oxide, titanium oxide, silicon oxide and aluminum oxide, metal hydroxides such as magnesium hydroxide, aluminum hydroxide and calcium hydroxide, carbonates such as magnesium carbonate, aluminum carbonate, calcium carbonate and barium carbonate, silicates such as magnesium silicate, calcium silicate, sodium silicate and aluminum silicate, sulfates such as aluminum sulfate, calcium sulfate and barium sulfate, synthetic hydrotalcite, metal sulfides such as molybdenum disulfide, iron sulfide and copper sulfide, diatom earth, asbestos, lithopone (zinc sulfide/barium sulfate), graphite, carbon black, carbon fluoride, calcium fluoride, coke, fluorine-containing resin, and the like.

Examples of the processing aid are higher fatty acids such as stearic acid, oleic acid, palmitic acid and lauric acid; higher fatty acid salts such as sodium stearate and zinc stearate; higher fatty acid amides such as stearic acid amide and oleic amide; higher fatty acid esters such as ethyl oleate; higher fatty acid amines such as stearylamine and oleilamine; petroleum wax such as carnauba wax and ceresine wax; polyglycols such as ethylene glycol, glycerine and diethylene glycol; aliphatic hydrocarbons such as vaseline and paraffin; silicone oil; silicone polymer; low molecular weight polyethylene; phthalic acid esters; phosphoric acid esters; rosin; (halogenated) dialkylamine; (halogenated) dialkylsulfone, surfactant; and the like.

Examples of the antioxidant, age resister and antiozonant are phenol compounds such as 2,5-di-t-amylhydroquinone, amine-ketone compounds such as 2,2,4-trimethyl-1,2-dihydroquinone, aromatic binary amine compounds such as 4,4'-bis(α,α-dimethylbenzyl)diphenylamine, and the like.

Examples of the ultraviolet ray absorber are benzophenone compounds such as 2,4-dihydroxybenzophenone, amine compounds such as bis(2,2,6,6-tetramethyl-4-piperizyl)sebacate, benzotriazole compounds such as 2-(2'-hydroxy-5'-methylphenyl)benzotriazole, and the like. An adding amount thereof differs depending on kind of additives and should be an amount not impairing a crosslinking reaction with ultraviolet rays.

The composition of the present invention can be prepared by known mixing methods. When the polymer is a resin, the mixing may be carried out at a temperature of not less than a melting point thereof by using an internal mixer, segment extruder, two-screw extruder, or the like. When the polymer is an elastomer and a molecular weight thereof is high, kneading may be carried out with an internal mixer such as an open roll or kneader mixer, and when the molecular weight thereof is low, mixing may be carried out with a planetary mixer, portable mixer, or the like. As far as the preparation is carried out in the room, there is no serious problem, but it is desirable that the mixing is carried out under the condition that no photo energy activating the photoinitiator is irradiated. Also the mixing may be carried out in a solution by using a good solvent.

In the present invention, suitable ultraviolet rays are those having a wavelength of from 420 to 150 nm. Also those having a wavelength range covering a maximum absorption wavelength of the above-mentioned photoinitiator can be used.

The composition of the present invention can be subjected to crosslinking with radiation and electron beams. The composition may be crosslinked with radiation or electron beams and as the case demands, in combination with ultraviolet rays. An irradiation time varies depending on an intensity of ultraviolet rays, kind of photoinitiator, etc. When the intensity of the irradiation is about 165 $mW/cm^2$, the irradiation time of from about ten seconds to about five minutes is enough. The irradiation can be carried out at room temperature.

The composition of the present invention is formed into a crosslinked article by crosslinking with ultraviolet rays. The crosslinked article can be used for various known applications. Particularly when a fluorine-containing polymer is used as a component polymer, the crosslinked article can be used for various parts in automotive industry, airplane industry and semiconductor industry by making the use of its excellent heat resistance, oil resistance, amine resistance, chemical resistance, etc. Further when a fluorine-containing elastomer is used, by utilizing its heat resistance, oil resistance and amine resistance, the crosslinked article can be used suitably for parts for oil sealing, for example, a hose, oil seal, etc. for engine oil of automotive, and also by utilizing its property of releasing less outgas, the crosslinked article can be used suitably for a gasket for a magnetic disc production apparatus, sealing materials for semiconductor production apparatuses and lines, etc.

Also the composition of the present invention can be used as a coating material. Concretely by dissolving or dispersing the composition of the present invention in a solvent such as water or organic solvent, a coating material which can be crosslinked with ultraviolet rays (further as the case demands, electron beams) is obtained.

The crosslinked article of the present invention can be applied on the following molded articles, but the application is not limited to them.

Applications of Molded Articles:

Packing, O-ring, hose, other sealing material, diaphragm and valve having amine resistance, oil resistance, chemical resistance, steam resistance and weather resistance in transportation means such as automotive, ship and airplane; similar packing, O-ring, sealing material, diaphragm, valve, hose, roll and tube in chemical plant; similar packing, O-ring, hose, sealing material, belt, diaphragm, valve, roll and tube in foods plant and foods processing machine (including domestic appliances); similar packing, O-ring, hose, sealing material, diaphragm, valve and tube in nuclear plant; similar packing, O-ring, hose, sealing material, diaphragm, valve, roll, tube, mandrel, cable, flexible joint, belt, rubber plate and weatherstrip in general industrial parts; roll, roll blade and belt for PPC copying machine, etc.

More concretely there are the following applications.

(i) Automotive applications

① For sealing
Crank shaft seal
Gear box seal
Power piston packing
Cylinder liner seal
Valve stem seal
Front pump seal for automatic transmission
Rear axle pinion seal
Gasket for universal joint
Pinion seal for speed meter
Piston cup for foot brake
O-ring and oil seal for torque transmission
Seal for after-burner for exhaust gas
Bearing seal ② For hose
EGR tube
Twin-carburetor tube ③ For diaphragm
Diaphragm for sensor of carburetor ④ Other applications
Vibration proof rubber (engine mount, exhaust system, etc.)
Hose for after burner (ii) Applications in chemical industries ① For sealing
Seals for pump, flow meter and pipe for chemicals
Seal for heat exchanger
Packing of glass cooler for sulfuric acid manufacturing equipment
Seals for sprinkler and transfer pump for agricultural chemicals
Seal for gas pipe
Seal for plating solution
Packing for high temperature vacuum dryer
Roll seal of belt for paper making
Seal for fuel battery
Joint seal for air duct ② For roll
Roll having trichlene resistance (for dyeing of fiber)

③ Other applications
Acid resistant hose (for concentrated sulfuric acid)
Packing for joint of tubes for gas chromatograph and pH meter
Chlorine gas transfer hose
Rainwater drain hoses for benzene and toluene reservoir tanks
Seal, tube, diaphragm and valve parts for analyzer and physical and chemical appliances (iii) Applications in industrial machinery ① For sealing
Seals for hydraulic and lubricating machine
Bearing seal
Seal for dry copying machine
Seals for window, etc. of dry cleaner
Seal for equipment for concentrating uranium hexafluoride Seal (vacuum) valve for cyclotron
Seal for automatic packaging machine ② Other applications
Rolls, scraper, tube and valve parts for printing equipment
Rolls, scraper, tube and valve parts for coating equipment
Ink tube, roll and belt for printer
Belt and rolls for dry copying machine
Diaphragms for pumps for analyzing sulfurous acid gas and chlorine gas in the air (environmental pollution-related meters)
Rolls and belt for printer
Squeeze rolls for pickling (iv) Airplane applications
Valve stem seal for jet engine
Fuel feeding hose, gasket and O-ring
Rotating shaft seal
Gasket for hydraulic equipment
Seal for fire wall (v) Ship applications
Stern seal for screw propeller shaft
Suction and exhaust valve stem seals for diesel engine
Valve seal for butterfly valve
Stem seal for butterfly valve (vi) Food and medicine applications
Seal for plate heat exchanger
Solenoid valve seal for vending machine
Plugs for chemicals (vii) Electrical applications
Insulation oil cap for a train of the Shikansen line
Venting seal for liquid ring transmission
Jacket for oil well cable Further the molded article of the present invention can be used for O-ring, sealing material, hose, tube, diaphragm, roll, lining and coating in equipment for producing semi-conductor, liquid crystal panel, plasma display panel, plasma address liquid crystal panel, field emission display panel, substrate for solar battery, etc., for example, CVD equipment, etching equipment, oxidation/diffusion equipment, sputtering equipment, ashing equipment, ion implantation equipment, exhausting equipment, and the like which require plasma resistance; O-ring, sealing material, hose, tube, diaphragm and roll in wet etcher, cleaning equipment, pipes for chemicals, gas pipes, and the like which require chemical resistance; and further O-ring, sealing material, hose, tube, diaphragm and roll to be used on parts of the mentioned equipment which are required to be free from dust and metal.

Examples of other applications where chemical resistance is required are O-ring, sealing material, hose, tube, diaphragm of pump and wafer transferring rolls for resist developing solution, releasing solution and wafer cleaning solution in production equipment for semiconductor, liquid crystal panel, plasma display panel, etc.

When the polymer is a low molecular weight polymer, molding or processing can be carried out easily at working site by using an extrusion gun such as a hot melt gun or a dispenser. In that case, when the polymer is a fluorine-containing elastomer, it is preferable that a number average molecular weight thereof is within a range of from 1,000 to 50,000. When the number average molecular weight is less than 1,000, the crosslinking becomes difficult, and when the number average molecular weight is more than 50,000, the extrusion becomes difficult.

Examples of the application for work which can be carried out at site are coating of metal gasket for automotive engine, gasket for oil pan of engine, roll of copying machine or printer, sealing for building, sealing of gasket for magnetic recorder, sealing of filter unit of clean room, coating of printed circuit board, fixing of electric and electronic parts, insulation and water-proof treatment of lead wire terminal of electrical equipment, sealing of an oven such as an electric oven, terminal treatment of sheath type heater, sealing of window frame of microwave oven, adhesion of CRT wedge and neck, adhesion of instrumentation parts of automotive, sealing of joints of kitchen, bath room and lavatory, etc.

The present invention is then explained concretely by means of examples, but is not limited thereto.

PREPARATION EXAMPLE 1

A 3-liter autoclave equipped with a thermometer, stirrer, nitrogen gas feeding tube and pressure reducing device was charged with 1,500 ml of pure water and 2 g of ammonium perfluorooctanoate. After the inside of the autoclave was sufficiently replaced with a vinylidene fluoride/hexafluoropropylene/tetrafluoroethylene gas mixture (hereinafter referred to as VdF/HFP/TFE, mole ratio: 18/71/11), a pressure and temperature of the inside of the autoclave were increased to 16 kg/cm$^2$G and 80° C., respectively. Then 10 ml of a 0.3% aqueous solution of ammonium persulfate was introduced under pressure with stirring. Since a pressure drop arose by the polymerization reaction, when the inside pressure decreased to 15 kg/cm$^2$G, a chain transfer agent I(CF$_2$)$_4$I (1.3 g) was introduced under pressure. At the time when the inside pressure was further decreased to 14 kg/cm$^2$G, it was again increased to 16 kg/cm$^2$G with a VdF/HFP/TFE gas mixture (50/20/30 in mole ratio). Thereafter the polymerization was continued while adjusting the inside pressure within the range of from 14 to 16 kg/cm$^2$G in such a manner.

When a total pressure drop reached 5 kg/cm$^2$G after starting of the polymerization reaction, 1.8 g of CF$_2$=CFOCF$_2$CF$_2$CH$_2$I was introduced. The polymerization was continued within the pressure range of from 14 to 16 kg/cm$^2$G similarly. When a reduction of an amount of the gas mixture in a bomb reached 400 g, the inside pressure was liberated to terminate the polymerization reaction. The obtained dispersion was frozen, coagulated and dried to obtain a polymer (hereinafter referred to as "Polymer A").

As a result of NMR analysis, components of the obtained polymer was VdF/HFP/TFE=50/20/30% by mole. According to GPC measurement, a number average molecular weight thereof was 140,000 (based on polystyrene). The iodine content thereof was 0.55% by weight according to an elementary analysis.

PREPARATION EXAMPLE 2

A 3-liter autoclave equipped with a thermometer, stirrer, nitrogen gas feeding tube and pressure reducing device was charged with 1,500 ml of pure water and 1.5 g of ammonium perfluorooctanoate. After the inside of the autoclave was sufficiently replaced with a vinylidene fluoride/hexafluoropropylene gas mixture (hereinafter referred to as VdF/HFP) (mole ratio: 45/55), a pressure and temperature of the inside of the autoclave were increased to 14 kg/cm$^2$G and 80° C., respectively. Then 4.5 g of I(CF$_2$CF$_2$)$_2$I as a polymerization initiator (25° C.) was added and 10 ml of a 3% aqueous solution of ammonium persulfate was introduced under pressure with stirring. Since a pressure drop arose by the polymerization reaction, when the inside pressure decreased to 13 kg/cm$^2$G, the inside pressure was again increased to 15 kg/cm$^2$G with a VdF/HFP gas mixture (78/22 in mole ratio). Thereafter the polymerization was continued while adjusting the inside pressure within the range of from 13 to 15 kg/cm$^2$G in such a manner. When a reduction of an amount of the gas mixture in a bomb reached 400 g, the inside pressure was liberated to terminate the polymerization reaction. The obtained dispersion was frozen, coagulated and dried to obtain a polymer (hereinafter referred to as "Polymer B").

As a result of NMR analysis, components of the obtained polymer was VdF/HFP=78/22% by mole. According to GPC measurement, a number average molecular weight thereof was 41,000 (based on polystyrene). The iodine content thereof was 0.6% by weight according to an elementary analysis.

PREPARATION EXAMPLE 3

A 1-liter separable flask equipped with a thermometer, stirrer, nitrogen gas feeding tube and pressure reducing device was charged with 400 g of pure water, 0.2 g of sodium bicarbonate, 1 g of sodium dodecylsulfate, 1 g of polyoxyethylene nonyl phenyl ether and 100 g of a monomer mixture (ethyl acrylate/2-iodoethyl acrylate=99/1. % by weight). After the inside of the flask was sufficiently replaced with nitrogen gas, 0.01 g of sodium hydrosulfite, 0.002 g of sodium formaldehyde sulfoxylate and 0.005 g of t-butyl hydroperoxide were added to initiate a polymerization reaction at 35° C. After six-hour reaction had been carried out so that a conversion of the polymerization became not less than 99%, the reaction product was subjected to salting-out, washing with water and drying to obtain a polymer (hereinafter referred to as "Polymer C").

The iodine content of the obtained polymer was 0.43% by weight as a result of elementary analysis.

PREPARATION EXAMPLE 4

A 1-liter separable flask equipped with a thermometer, stirrer, nitrogen gas feeding tube and pressure reducing device was charged with 400 g of pure water, 0.2 g of sodium bicarbonate, 1 g of sodium dodecylsulfate, 1 g of polyoxyethylene nonyl phenyl ether and 100 g of a monomer (ethyl acrylate=100% by weight). After the inside of the flask was sufficiently replaced with nitrogen gas, 0.01 g of sodium hydrosulfite, 0.002 g of sodium formaldehyde sulfoxylate and 0.005 g of t-butyl hydroperoxide were added to initiate a polymerization reaction at 35° C. After six-hour reaction had been carried out so that a conversion of the polymerization became not less than 99%, the reaction product was subjected to salting-out, washing with water and drying to obtain a polymer (hereinafter referred to as "Polymer D").

EXAMPLE 1

To 100 parts of Polymer A prepared in Preparation Example 1 were mixed 1.4 parts of 1-hydroxycyclohexyl phenylketone as a photoinitiator and 4.7 parts of trimethylolpropane triacrylate (TMPTA) as a polyfunctional unsaturated compound (crosslinking aid), and the mixture was kneaded and uniformly dispersed with an internal mixer. Then the obtained composition was subjected to pre-molding by pressing at a specific temperature to obtain an about 0.5 mm thick sheet.

The sheet was passed through a conveyor type ultraviolet ray irradiation equipment to be subjected to irradiation with ultraviolet rays. Thereby a crosslinked article was obtained. With respect to the irradiation conditions, an intensity of ultraviolet rays was about 165 mW/cm$^2$, an irradiation time was about 30 seconds and an ambient temperature was room temperature (about 25° C.).

With respect to the crosslinked article, solubility in acetone (the crosslinked article was dipped in acetone at room temperature for three hours with stirring, and solubility was observed with naked eyes) and physical properties in normal state according to JIS K-6301 were measured. The results are shown in Table 1.

EXAMPLES 2 to 5

Components shown in Table 1 were mixed and pre-molded in the same manner as in Example 1 to obtain an about 0.5 mm thick sheet. The sheet was subjected to ultraviolet ray irradiation under the same irradiation conditions as in Example 1 to obtain a crosslinked article and its solubility in acetone and physical properties in normal state were determined. The results are shown in Table 1.

TABLE 1

| | Example | | | | |
|---|---|---|---|---|---|
| | 1 | 2 | 3 | 4 | 5 |
| Polymer composition (part by weight) Polymer | | | | | |
| Polymer A | 100 | 100 | 100 | 100 | 100 |
| Polymer B | | | | | |
| Polymer C | | | | | |
| Photoinitiator | | | | | |
| 1-hydroxycyclohexyl phenylketone | 1.4 | 4.2 | | | 4.2 |
| 2,2-dimethoxy-2-phenylacetone | | | 2.7 | | |
| Benzophenone | | | | 1.9 | |
| Photoinitiating aid | | | | | |
| Triethanolamine | | | | 0.63 | |
| Polyfunctional unsaturated compound | | | | | |
| TMPTA | 4.7 | | 4.7 | 4.7 | 4.7 |
| TAIC | | 4 | | | |
| Physical properties of crosslinked article | | | | | |
| Solubility in acetone | In-soluble | In-soluble | In-soluble | In-soluble | In-soluble |
| Physical properties in normal state | | | | | |
| 100% tensile stress (MPa) | 3 | 1 | 1 | 1 | 1 |
| Strength at break (MPa) | 6 | 4 | 5 | 3.5 | 4.5 |
| Elongation at break (%) | 700 | 540 | 520 | 600 | 550 |
| Hardness (JIS A) | 56 | 55 | 55 | 55 | 54 |

EXAMPLES 6 to 8

Components shown in Table 2 were mixed and pre-molded in the same manner as in Example 1 to obtain an about 0.5 mm thick sheet. In Examples 6 and 7, Polymer B prepared in Preparation Example 2 was used as an iodine-containing polymer, and in Example, 8, Polymer C prepared in Preparation Example 3 was used as an iodine-containing polymer.

The sheet was subjected to ultraviolet ray irradiation under the same irradiation conditions as in Example 1 to give a crosslinked article and its solubility in acetone and physical properties in normal state were determined. The results are shown in Table 2.

TABLE 2

|  | Example | | |
| --- | --- | --- | --- |
|  | 6 | 7 | 8 |
| Polymer composition (part by weight) Polymer | | | |
| Polymer A | | | |
| Polymer B | 100 | 100 | |
| Polymer C | | | 100 |
| Photoinitiator | | | |
| 1-hydroxycyclohexyl phenylketone | 4.2 | 4.2 | 2.1 |
| 2,2-dimethoxy-2-phenylacetone | | | |
| Benzophenone | | | |
| Photoinitiating aid | | | |
| Triethanolamine | | | |
| Polyfunctional unsaturated compound | | | |
| TMPTA | | | |
| TAIC | 4 | 8 | 4 |
| Physical properties of crosslinked article | | | |
| Solubility in acetone | Insoluble | Insoluble | Insoluble |
| Physical properties in normal state | | | |
| 100% tensile stress (MPa) | 0.3 | 0.5 | 2 |
| Strength at break (MPa) | 2 | 5 | 4 |
| Elongation at break (%) | 900 | 370 | 450 |
| Hardness (JIS A) | 36 | 50 | 58 |

COMPARATIVE EXAMPLES 1 to 5

Components shown in Table 3 were mixed and premolded in the same manner as in Example 1 to obtain an about 0.5 mm thick sheet. In Comparative Examples 1 and 2, a fluorine-containing elastomer of VDF/HFP/TFE terpolymer (DAIEL G501 available from DAIKIN INDUSTRIES, LTD.) containing no iodine was used as a polymer, in Comparative Example 3, Polymer A prepared in Preparation Example 1 was used as a polymer (no photoinitiator was used), in Comparative Example 4, Polymer A was used as a polymer (no polyfunctional unsaturated compound was used), and in Comparative Example 5, Polymer D prepared in Preparation Example 4 and having neither iodine nor bromine was used as a polymer.

The sheet was subjected to ultraviolet ray irradiation under the same irradiation conditions as in Example 1 to obtain a crosslinked article and its solubility in acetone and physical properties in normal state were determined. The results are shown in Table 3.

TABLE 3

|  | Comparative Example | | | | |
| --- | --- | --- | --- | --- | --- |
|  | 1 | 2 | 3 | 4 | 5 |
| Polymer composition (part by weight) Polymer | | | | | |
| G501 | 100 | 100 | | | |
| Polymer A | | | 100 | 100 | |
| Polymer D | | | | | 100 |
| Photoinitiator | | | | | |
| 1-hydroxycyclohexyl phenylketone | 2.1 | 2.1 | | 2.1 | 2.1 |
| 2,2-dimethoxy-2-phenylacetone | | | | | |
| Benzophenone | | | | | |
| Photoinitiating aid | | | | | |
| Triethanolamine | | | | | |
| Polyfunctional unsaturated compound | | | | | |
| TMPTA | 4.7 | | | | |
| TAIC | | 4 | 4 | | 4 |
| Physical properties of crosslinked article | | | | | |
| Solubility in acetone | Dissolved | Dissolved | Dissolved | Dissolved | Dissolved |
| Physical properties in normal state | | | | | |
| 100% tensile stress (MPa) | Plastic deformation | Plastic deformation | Plastic deformation | Plastic deformation | Plastic deformation |
| Strength at break (MPa) | Plastic deformation | Plastic deformation | Plastic deformation | Plastic deformation | Plastic deformation |
| Elongation at break (%) | Unmeasurable | Unmeasurable | Unmeasurable | Unmeasurable | Unmeasurable |
| Hardness (JIS A) | Unmeasurable | Unmeasurable | Unmeasurable | Unmeasurable | Unmeasurable |

INDUSTRIAL APPLICABILITY

According to the present invention, by using iodine and/or bromine as a crosslinking point, it is possible to carry out crosslinking of various polymers including fluorine-containing polymers which have been very difficult to crosslink with ultraviolet rays, and molding or processing can be made easily at working site at low temperature.

What is claimed is:

1. A polymer composition which is crosslinkable with ultraviolet rays and comprises a polymer containing 0.001 to 10% by weight of iodine, a photoinitiator as a crosslinking agent and a polyfunctional unsaturated compound as a crosslinking aid, wherein the polymer does not contain bromine and wherein the polymer is a fluorine-containing polymer.

2. The polymer composition of claim 1, wherein the fluorine-containing polymer is a fluorine-containing elastomer.

3. A crosslinked article obtained by subjecting the ultraviolet-crosslinkable polymer composition of claim 1 to ultraviolet irradiation.

4. A gasket for magnetic disc production apparatus which is obtained by subjecting the ultraviolet-crosslinkable polymer composition of claim 1 to ultraviolet irradiation.

5. A fluorine-containing polymer coating material comprising the ultraviolet-crosslinkable polymer composition of claim 1.

6. A crosslinked article obtained by subjecting the ultraviolet-crosslinkable polymer composition of claim 1 to ultraviolet irradiation.

7. A crosslinked article obtained by subjecting the ultraviolet-crosslinkable polymer composition of claim 2 to ultraviolet irradiation.

8. A gasket for magnetic disc production apparatus which is obtained by subjecting the ultraviolet-crosslinkable polymer composition of claim 1 to ultraviolet irradiation.

9. A gasket for magnetic disc production apparatus which is obtained by subjecting the ultraviolet-crosslinkable polymer composition of claim 2 to ultraviolet irradiation.

10. A fluorine-containing polymer coating material comprising the ultraviolet-crosslinkable polymer composition of claim 2.

* * * * *

(12) INTER PARTES REEXAMINATION CERTIFICATE (0092nd)
United States Patent
Minamino et al.

(10) Number: US 6,974,845 C1
(45) Certificate Issued: Aug. 11, 2009

(54) POLYMER COMPOSITION CROSSLINKABLE WITH ULTRAVIOLET

(75) Inventors: Etsuo Minamino, Osaka (JP); Kazuyoshi Mimura, Matsusaka (JP); Mitsuhiro Otani, Settsu (JP)

(73) Assignee: Daikin Industries, Ltd., Kita-Ku, Osaka-Shi, Osaka (JP)

Reexamination Request:
No. 95/000,215, Feb. 15, 2007

Reexamination Certificate for:
Patent No.: 6,974,845
Issued: Dec. 13, 2005
Appl. No.: 10/069,791
Filed: Feb. 28, 2002

(22) PCT Filed: Aug. 28, 2000
(86) PCT No.: PCT/JP00/05780
§ 371 (c)(1),
(2), (4) Date: Feb. 28, 2002
(87) PCT Pub. No.: WO01/16234
PCT Pub. Date: Mar. 8, 2001

(30) Foreign Application Priority Data
Aug. 31, 1999 (JP) .......... 11-244653

(51) Int. Cl.
*C08J 3/28* (2006.01)

(52) U.S. Cl. .......... 522/117; 522/121; 522/279; 522/281; 522/305; 522/313

(58) Field of Classification Search .......... None
See application file for complete search history.

(56) References Cited

U.S. PATENT DOCUMENTS

| | | | |
|---|---|---|---|
| 5,169,902 A | 12/1992 | Yagi et al. | 525/301 |
| 6,346,300 B1 | 2/2002 | Ruepping | 427/517 |

*Primary Examiner*—Jerry D. Johnson

(57) ABSTRACT

An ultraviolet-crosslinkable polymer composition comprising a polymer containing iodine and/or bromine in an amount of from 0.001 to 10% by weight, a photoinitiator as a crosslinking agent and a polyfunctional unsaturated compound as a crosslinking aid. By using iodine and/or bromine as a crosslinking point, it is possible to carry out crosslinking of various polymers including fluorine-containing polymers which have been very difficult to crosslink with ultraviolet rays, and molding or processing can be made easily at working site at low temperature.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *